(12) United States Patent
Kojima et al.

(10) Patent No.: US 8,307,166 B2
(45) Date of Patent: Nov. 6, 2012

(54) INFORMATION PROCESSING PROGRAM, INFORMATION PROCESSING DEVICE AND INFORMATION PROCESSING METHOD

(75) Inventors: Hisashi Kojima, Kawasaki (JP); Masahiro Nakada, Kawasaki (JP); Tetsuya Shioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 12/725,980

(22) Filed: Mar. 17, 2010

(65) Prior Publication Data

US 2010/0250866 A1    Sep. 30, 2010

(30) Foreign Application Priority Data

Mar. 31, 2009   (JP) ................................ 2009-088382

(51) Int. Cl.
*G06F 12/14* (2006.01)

(52) U.S. Cl. ................. 711/147; 711/152; 711/E12.095

(58) Field of Classification Search .................. 711/147, 711/152, E12.095
See application file for complete search history.

(56) References Cited

U.S. PATENT DOCUMENTS

| | | | |
|---|---|---|---|
| 5,123,094 A | 6/1992 | MacDougall | |
| 2004/0068563 A1 | 4/2004 | Ahuja et al. | |
| 2008/0104337 A1 | 5/2008 | VelurEunni | |

FOREIGN PATENT DOCUMENTS

JP          01-205362          8/1989

OTHER PUBLICATIONS

European Search Report for corresponding European Application 10156651.1-1243; date Apr. 27, 2012.

*Primary Examiner* — Yong Choe
(74) *Attorney, Agent, or Firm* — Staas & Halsey LLP

(57) ABSTRACT

An apparatus includes: a memory; a management memory for storing first virtual addresses used by the first program, second virtual addresses used by the second program and management information indicative of association between first and second virtual addresses and physical addresses of the memory; and a processor for executing the first, the second and a management programs, the management program including: receiving a request to assign a shared area to be shared by the first and second programs from the second program; determining a physical address of the shared area corresponding to one of the first and one of the second virtual addresses; transmitting a notification of data writing by the first program to the second program; locking the shared area so as to prevent the second program from writing data after the notification; and unlocking the shared area after the second program has read data from the shared area.

14 Claims, 7 Drawing Sheets

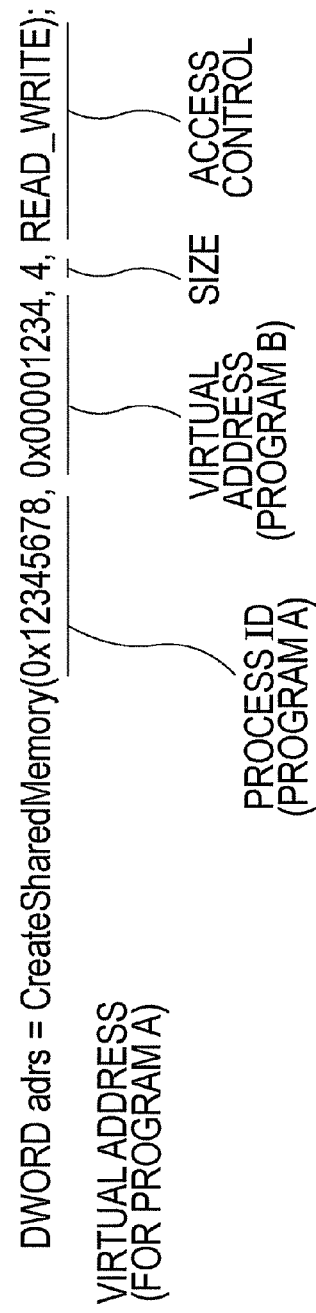

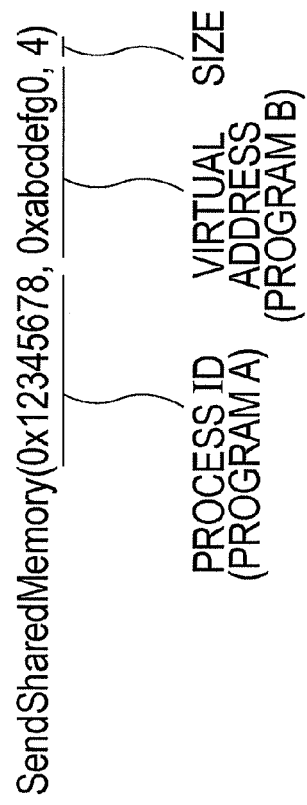

FIG. 7

WriteSharedMemory(0x12345678, 0xabcdefg0, 4)

- PROCESS ID (PROGRAM B)
- VIRTUAL ADDRESS (PROGRAM A)
- SIZE

FIG. 8

ChangeSharedMemory(0x12345678, 0xabcdefg0, 4, READ_ONLY)

- PROCESS ID (PROGRAM A)
- VIRTUAL ADDRESS (PROGRAM A)
- SIZE
- ACCESS CONTROL

INFORMATION PROCESSING PROGRAM, INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2009-088382, filed on Mar. 31, 2009 the entire contents of which are incorporated herein by reference.

FIELD

The embodiments discussed herein are related to an information processing program.

BACKGROUND

In the field of inter-process communication using a shared memory, there has been known a technique of enabling reading/writing from both client and server processes, aiming at efficient data access.

In connection with the above-described technique, there has also been proposed a technique of typically allowing exclusive access to a shared memory (see Japanese Laid-Open Patent Publication No. 01-205362).

In the above-described conventional techniques, however, it is assumed that data may be rewritten by a client process, during a period in which a server process checks the safety of data written by the client process into the shared memory, up to the time when the checked data is used. While there has also been known a technique for copying the data in the shared memory into a non-shared memory by the server process, as a countermeasure for the situation, the technique is not efficient because copying takes a long time, and makes the available memory capacity small.

On the other hand, the above-described technique of allowing exclusive access to the shared memory making use of a lock function of the OS (Operating System) generally needs cooperation of the client and server processes, so that the technique lacks efficacy if the client process contains malicious code.

SUMMARY

According to an aspect of the invention, an information processing device includes: a memory; a management memory for storing first virtual addresses used by the first program, second virtual addresses used by the second program and management information indicative of association between first and second virtual addresses and physical addresses of the memory; and a processor for executing the first, the second and a management programs, the management program including: receiving a request to assign a shared area to be shared by the first and second programs from the second program; determining a physical address of the shared area corresponding to one of the first and one of the second virtual addresses; transmitting a notification of data writing by the first program to the second program; locking the shared area so as to prevent the second program from writing data after the notification; and unlocking the shared area after the second program has read data from the shared area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a drawing illustrating an exemplary configuration of a page table in the first embodiment.

FIG. 4 is a drawing illustrating an exemplary system call which requests assignment of the shared memory in the first embodiment;

FIG. 5 is a drawing illustrating an exemplary configuration of memory management information in the first embodiment;

FIG. 6 is a drawing illustrating an exemplary system call used for notifying a virtual address in the first embodiment;

FIG. 7 is a drawing illustrating an exemplary system call used for notifying writing of data into the shared memory in the first embodiment;

FIG. 8 is a drawing illustrating an exemplary system call used for requesting access control with respect to the shared memory in the first embodiment;

DESCRIPTION OF EMBODIMENTS

Hereinafter, preferred embodiments will be described in detail with reference to drawings. The embodiments disclosed herein have been conceived after considering the above-described situation, wherein an object of which is to provide an information processing program, an information processing device and an information processing method capable of ensuring efficient access control with respect to a shared memory, while maintaining data integrity. According to one embodiment of the technique, an efficient access control with respect to the shared memory may be ensured, while maintaining data integrity.

Embodiments of the information processing program, the information processing device and the information processing method of the present invention will be detailed below, referring to the attached drawings. It is to be understood that the technique of the present invention is by no means limited to the embodiments of the information processing program, the information processing device and the information processing method.

First Embodiment

In the information processing device of the first embodiment, operation (for example, inter-process operation) using a so-called shared memory (shared area), which is a common physical address space corresponding to virtual address spaces respectively accessible by different programs, is controlled.

The information processing device of the first embodiment is explained below. When an access restriction request with respect to the shared memory issued by a program on the user side of the shared memory (program A, for example) is accepted, whether the access restriction request is issued by a program on the owner side of the shared memory (program B, for example) or not is judged. If the access restriction request is judged as being issued by the program on the owner side of the shared memory (program B, for example), access to the shared memory by the program on the user side of the shared memory (program A, for example) is restricted. The information processing device of the first embodiment will more specifically be explained below.

Configuration of Information Processing Device

The First Embodiment

Figure 1:
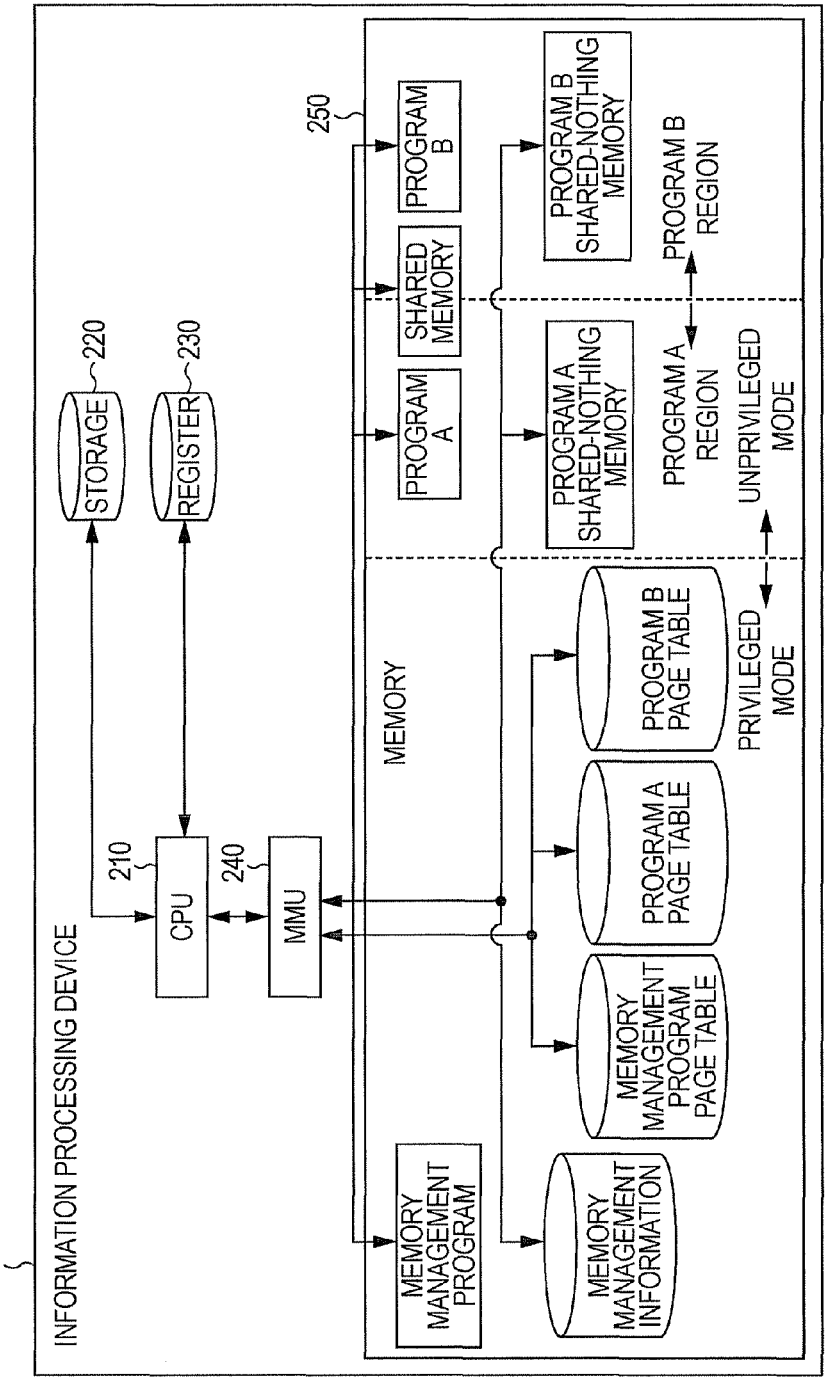
FIG. 1 is a drawing illustrating a configuration of an information processing device of a first embodiment.

FIG. 1 is a drawing illustrating a configuration of the information processing device of the first embodiment. As illustrated in this drawing, an information processing device 200 of the first embodiment has a CPU 210, a storage 220, a register 230, an MMU 240 and a memory 250.

The CPU 210 has an internal memory for storing a predetermined control program, programs which specify various processing procedures, and necessary data, and executes various processes such as control of the information processing device, data calculation, and data processing.

The CPU 210 also has execution modes such as a privileged mode capable of operating the MMU 240, an unprivileged mode incapable of operating the MMU 240, and so forth, and can restrict memory access in the unprivileged mode. Any programs running in the unprivileged mode cannot enter the privileged mode without being authorized by the program running in the privileged mode.

The storage 220 stores data, programs and so forth. The register 230 holds the states of calculation and processing executed by the CPU 210.

The MMU (Memory Management Unit) 240 manages the memory 250.

The memory 250 allows the memory management program, the program A, the program B and so forth to be loaded thereon. The memory 250 also contains a shared memory, memory management information, memory management program page table, program A page table, program B page table, program A non-shared memory, and program B non-shared memory.

In particular, the memory management program controls access to the shared memory by the program A and program B. For example, the memory management program functions as a process of executing processing with respect to the memory management, after being read from the memory 250 by the CPU 210 and loaded on the memory 250. Specific contents of processing by the memory management program will be explained later in relation to the process flow (FIG. 2A and FIG. 2B) by the information processing device 200.

The program A and the program B run in the unprivileged mode, and have virtual address spaces corresponded to physical address regions different from each other. The shared memory is a common physical address region to which a part of a virtual address space owned by the program A and a part of a virtual address space owned by program B correspond.

The memory management information is information for managing the memory 250. The memory management program page table, the program A page table and the program B page table are tables used for mutual conversion between the virtual address and the physical address.

The program A non-shared memory is a memory used solely by the program A. The program B non-shared memory is a memory used solely by the program B.

Processing by Information Processing Device

The First Embodiment

Figure 2A:
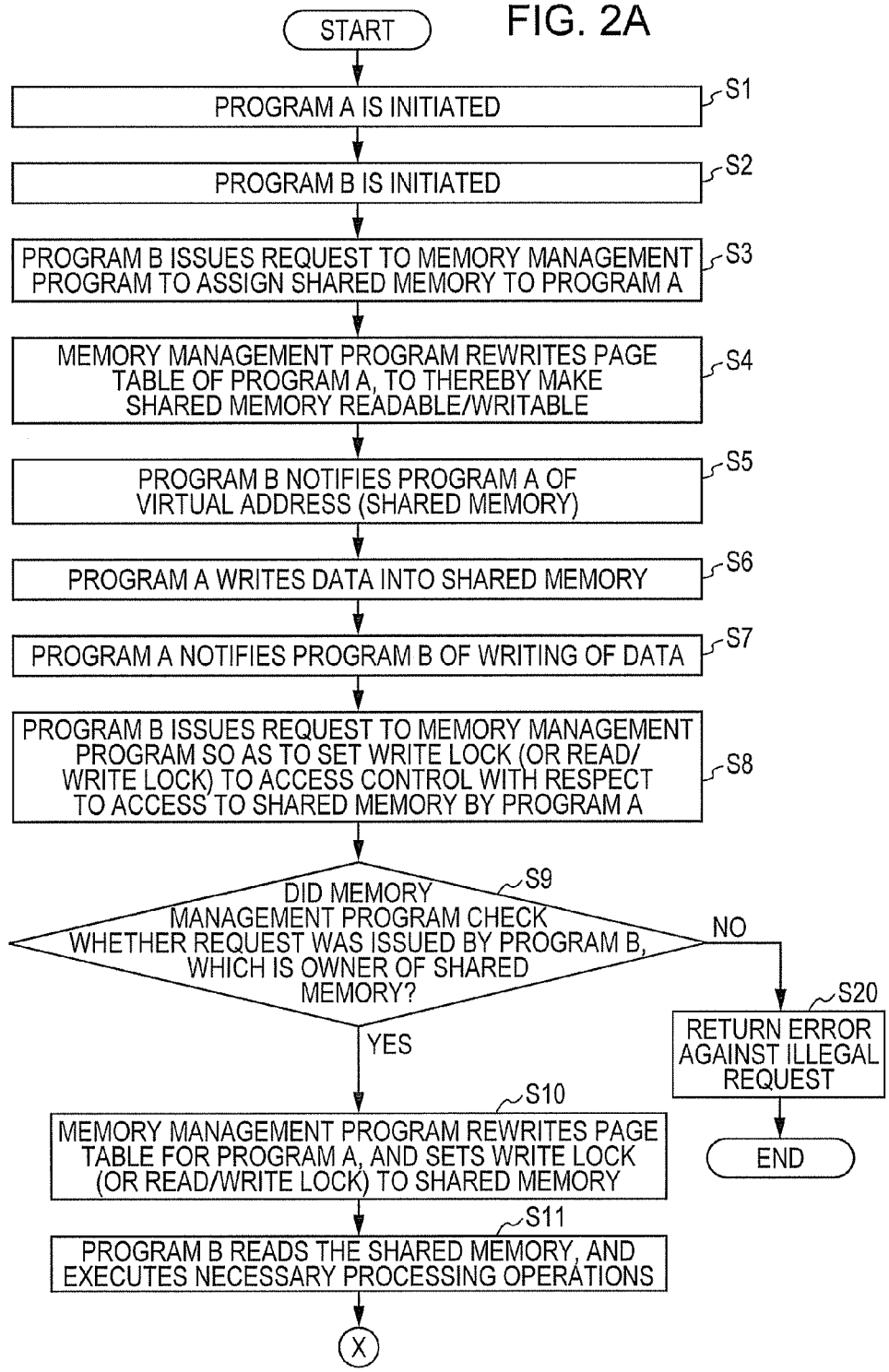
FIG. 2A and FIG. 2B are drawings illustrating a process flow executed by the information processing device of the first embodiment.
Figure 2B:
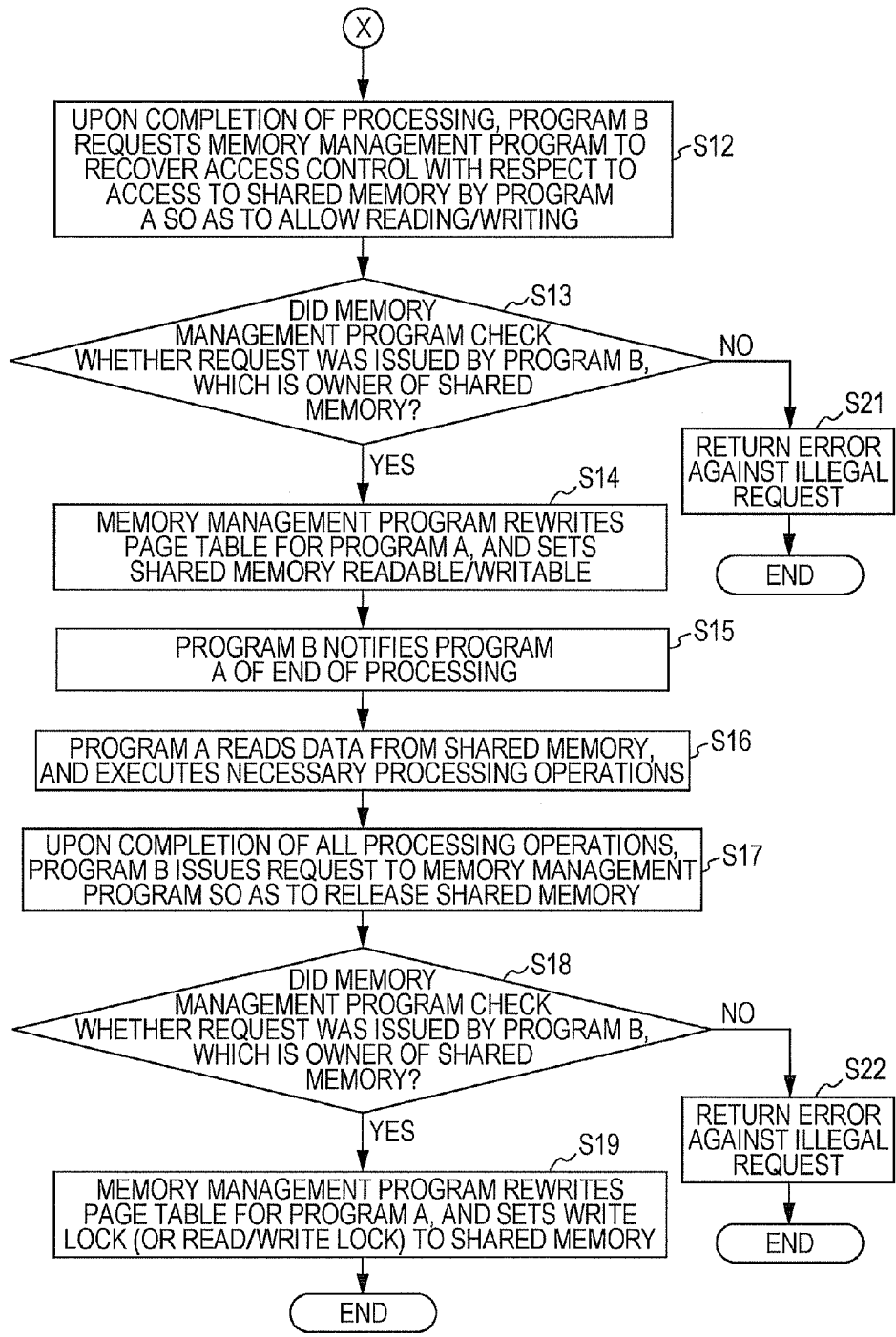

FIG. 2A and FIG. 2B are drawings illustrating a process flow by the information processing device of the first embodiment. The description below will explain the process flow, mainly for the individual programs (memory management program, program A and program B) running on the information processing device 200. In practice, the individual programs function as processes, after being read out from the memory 250 by the CPU 210 and loaded on the memory 250.

As illustrated in the drawing, the program A is initiated (step S1). A program file of the program A is stored in a data storage device such as the storage 220, and executed after being loaded on the memory 250 by the CPU 210.

The program A herein is now assumed to be data on the client side, and is a program that is not trustworthy from the viewpoint of the program B. The program A is given a specific process ID by the OS (Operating System) running on the CPU 210. Also a page table for program A is prepared in the memory 250.

Next, the program B is initiated (step S2). The program B is, for example, on the server side which receives data, and is given a specific process ID by the OS (Operating System) running on the CPU 210. Also a page table for the program B is prepared in the memory 250. As illustrated in FIG. 3, the page tables for the programs A and B typically store virtual addresses, physical addresses, and information representing attributes of the access control with respect to the virtual addresses, in a correlated manner. FIG. 3 is a drawing illustrating an exemplary configuration of the page table in the first embodiment.

The program B issues a request to the memory management program to assign the shared memory to the program A (step S3). The request from the program B to the memory management program herein is executed typically using a system call of a general OS, typically as illustrated in FIG. 4. FIG. 4 is a drawing illustrating an exemplary system call which requests assignment of the shared memory in the first embodiment.

The shared memory is embodied by making a part of the memory region assigned to the program B accessible also by the program A. When the program B issues a request to the memory management program to assign the shared memory to the program A, the program B specifies a virtual address and so forth of a region of the memory which is desired to be shared, as an argument of the system call. Also an attribute of the access control, such that whether the shared memory is made readable/writable or only writable by the program A, is selected.

Upon receiving the request by the program B, the memory management program rewrites the page table of the program A, to thereby make the shared memory readable/writable (step S4).

More specifically, a physical address of the memory region is acquired on the basis of the page table of the program B, and a preliminarily acquired physical address is added to the page table of the program A. In addition, the memory management program assigns an appropriate virtual address corresponding to the thus-added physical address, and adds the attributes of the access control.

Upon completion of addition of the attributes of the access control, the memory management program then returns the virtual address for the program A as a return value of the system call to the program B. The memory management program also records that the program B prepared the shared memory for the program A, in memory management information in the memory 250.

The memory management information stores, typically as illustrated in FIG. 5, the process ID (for example, process ID given to the program B) of the owner of the shared memory, the virtual address, the size, the process ID (for example, process ID given to the program A) of the user, and the virtual address in a correlated manner. FIG. 5 is a drawing illustrating an exemplary configuration of the memory management information in the first embodiment.

Upon rewriting of the page table for the program A by the memory management program, the program B notifies the program A of the virtual address (shared memory), accepted as a return value of the system call from the memory management program, to the program A by a system call (step S5).

Upon being notified of the virtual address by the program B, the memory management program notifies the program A of the virtual address. FIG. 6 illustrates an exemplary system call used when the program B notifies the program A of the virtual address. FIG. 6 is a drawing illustrating an exemplary system call used for notifying the virtual address in the first embodiment.

Upon being notified of the virtual address (shared memory), the program A writes data into the shared memory (step S6), and notifies the program B of completion of the writing of data into the shared memory (step S7).

Upon being notified of the writing of data into the shared memory from the program A, the memory management program notifies the program B of the writing of data into the shared memory. FIG. 7 illustrates an exemplary system call for notifying the writing of data into the shared memory, from the program A to the program B. FIG. 7 is a drawing illustrating an exemplary system call used for notifying the writing of data into the shared memory in the first embodiment.

Upon being notified of the writing of data, the program B issues a request to the memory management program so as to set write lock (or read/write lock) to the attributes of the access control with respect to access to the shared memory by the program A (step S8). FIG. 8 illustrates an exemplary system call issued by the program B for requesting the memory management program to execute access control with respect to access to the shared memory by the program A. FIG. 8 is a drawing illustrating an exemplary system call used for requesting access control with respect to the shared memory in the first embodiment.

Upon being requested by the program B, the memory management program checks whether the request for the access control with respect to the access to the shared memory by the program A was issued by the program B, which is the owner of the shared memory (step S9).

More specifically, the memory management program refers to the memory management information (FIG. 5) of the program B which is the requester of the access control, and then checks whether the process ID of the program B contained in the system call of the access control request, and the specified virtual address are contained as the owner of the shared memory in the memory management information.

If it was found by the check that the request of access control with respect to access to the shared memory by the program A was issued by the program B, which is the owner of the shared memory (YES in step S9), the memory management program rewrites the page table for the program A, and sets write lock (or read/write lock) to the shared memory (step S10).

Upon completion of the re-writing of the page table for the program A by the memory management program, the program B reads the shared memory, and executes necessary processing operations (for example, output of text data and picture data, replay of movie data, and so forth) (step S11).

Upon completion of the processing operations, the program B requests the memory management program to recover the attributes of the access control with respect to access to the shared memory by the program A so as to allow reading/writing, using the system call (see FIG. 7, for example) (step S12).

The memory management program checks, similarly to as in step S9 described above, whether the request of access control with respect to access to the shared memory by the program A was issued by the program B, which is the owner of the shared memory (step S13).

If it was found by the check that the request of access control with respect to access to the shared memory by the program A was issued by the program B, which is the owner of the shared memory (YES in step S13), the memory management program rewrites the page table for the program A, and sets the shared memory readable/writable (step S14).

Upon completion of the re-writing of the page table for the program A by the memory management program, the program B notifies the program A of the end of processing using the system call (step S15).

Figure 9:
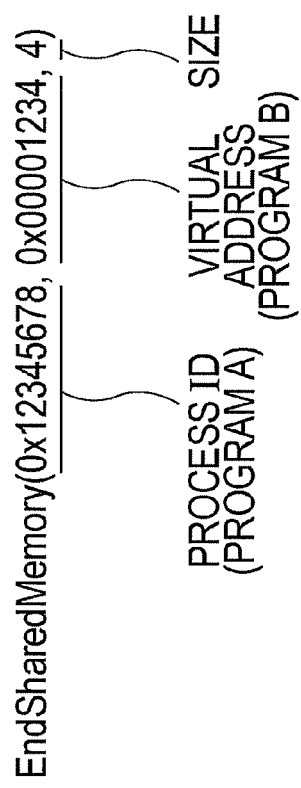
FIG. 9 is a drawing illustrating an exemplary system call used for notifying the end of process in the first embodiment.

Upon receiving the system call which indicates the end of processing from the program B, the memory management program notifies the program A of the end of processing. FIG. 9 illustrates an exemplary system call issued by the program B for notifying the program A of the end of processing. FIG. 9 is a drawing illustrating an exemplary system call used for notifying the end of processing in the first embodiment.

Upon being notified of the end of processing, the program A reads data from the shared memory, and executes necessary processing operations (step S16).

Figure 10:
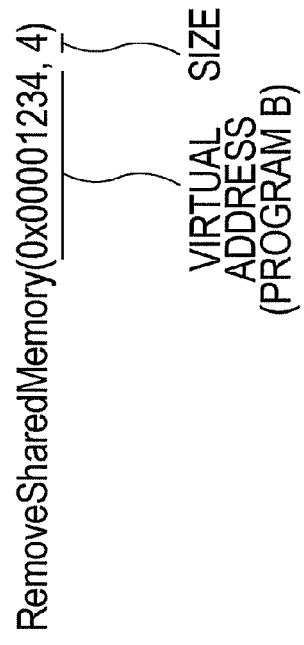
FIG. 10 is a drawing illustrating an exemplary system call used for releasing the shared memory in the first embodiment.

After completion of all processing operations using the shared memory, the program B issues a request to the memory management program so as to release the shared memory, using a system call (step S17). FIG. 10 illustrates an exemplary system call used for requesting release of the shared memory. FIG. 10 is a drawing illustrating an exemplary system call used for requesting release of the shared memory in the first embodiment.

Upon being requested by the program B, the memory management program checks, in a manner similar to steps S9 and S13 described above, whether the request of release of the shared memory was issued by the program B, which is the owner of the shared memory (step S18).

If it was found by the check that the request of release of the shared memory was issued by the program B, which is the owner of the shared memory (YES in step S18), the memory management program rewrites, in a manner similar to step S10 described above, the page table for the program A, and sets write lock (or read/write lock) to the shared memory (step S19).

Referring now back to step S9, if it was found by the check that the request of access control with respect to access to the shared memory by the program A was not issued by the program B, which is the owner of the shared memory (NO in step S9), the memory management program returns an error to indicate an illegal request (step S20), and terminates the processing.

Referring now back to step S13, if it was found by the check that the request of access control with respect to access to the shared memory by the program A was issued but not by the program B, which is the owner of the shared memory (NO in step S13), the memory management program returns an error to indicate an illegal request (step S21), and terminates the processing.

Referring now back to S18, if it was found by the check that the request of release of the shared memory was issued but not by the program B, which is the owner of the shared memory (NO in step S18), the memory management program returns an error to indicate an illegal request (step S22), and terminates the processing.

Effects of the First Embodiment

As has been described in the above, according to the first embodiment, upon receiving the access restriction request with respect to access to the shared memory by the program on the user side of the shared memory (for example, program A), whether the access restriction request was issued by the program on the owner side of the shared memory (for example, program B) or not is judged. If the access restriction request is found to be issued by the program on the owner side of the shared memory (for example, program B), access to the shared memory by the program on the user side of the shared memory (for example, program A) is restricted.

As a consequence, for example in an inter-process communication executed in the information processing device 200 using the shared memory, efficient access control may be achieved, while maintaining data integrity (while preventing overwriting of the shared memory by the program A during processing by the program B).

In other words, for example, the above-described program B (for example, server process) may safely process data written by the program A (for example, client process) into the shared memory.

In addition, since it is no longer necessary to copy data in the shared memory, as a provision against overwriting of data, the first embodiment is efficient in terms of processing speed and memory consumption. As has been described above, data safety may be improved while maintaining the performance of the information processing device 200.

Many types of OS at present determine access control with respect to a shared memory in a static manner, allowing no transition of the state of access control once the shared memory is set between the processes. Also no function of allowing forced transition of the state of access control with respect to the shared memory from one process to the other process has been achieved.

In contrast, according to the first embodiment, access control with respect to a shared memory may be achieved seemingly in a dynamic manner, and thereby efficient access control may be achieved.

The first embodiment, which has been described in the above referring to the case where memory management program enables access control of the program by re-writing the attributes of the access control in the program page table, is not limited thereto.

For example, the memory management program may re-write the page table, so that the physical address, which corresponds to the virtual address space of the program to be controlled in the access control, may have an address different from that of the physical address of the shared memory. This strategy raises an effect of preventing data written in the shared memory from being re-written, just like re-writing of the attributes of the access control.

Second Embodiment 2

Another embodiment of the information processing program, the information processing device and the information processing method of the present invention will be explained below.

(1) Device Configuration and Others

The individual constituents of the information processing device 200 illustrated in FIG. 1 are those conceptually representing the functions thereof, so that it is not always necessary to physically configure the information processing device 200 as illustrated in the drawing. In other words, specific embodiments of distribution/integration of the information processing device 200 are not limited to that illustrated in the drawing. For example, the CPU 210 may be distributed on a functional or physical basis, depending on the details of processing.

As described in the above, the entire portion or a part of the information processing device 200 may be configured by arbitrary units which are functionally or physically distributed or, integrated, depending on various loads and states of use. Moreover, the individual process functions executed by the information processing device 200 (see FIG. 2A and FIG. 2B) may be embodied by the CPU 210 and by a program analyzed and executed by the CPU 210, or may be embodied as hardware based on wired logic.

(2) Information Processing Method

Information processing information as described below may be embodied by the information processing device 200 previously explained in the first embodiment.

More specifically, embodied herein is an information processing method which includes a shared region generation procedure which makes, upon being requested by a first program (for example, program A), a part of a virtual address space assigned to the first program (for example, program A) and a part of a virtual address space assigned to a second program correspond to a common physical address space, to thereby generate a shared region accessible by the first program and the second program (see step S3 and step S4 in FIG. 2A); a request judgment procedure which judges, upon receiving an access restriction request with respect to the shared region issued by the second program, whether the access restriction request is legal or not (see step S9 in FIG. 2A, for example); and an access restriction procedure which restricts access to the shared memory by the first program, if the access restriction request is judged as legal by the request judgment procedure (see step S10 in FIG. 2A, for example).

The management program executed by the processor may be provided in computer readable recording media. The computer readable recording media is a non-transitory medium. Such recording media include a flexible disk, CDs (CD-ROM, CD-R, CD-RW, etc.), DVDs (DVD-ROM, DVD-RAM, DVD-R, DVD+R, DVD-RW, DVD+RW, etc.), a magnetic disk, an optical disk, a magneto-optical disk, etc.

The information processing device reads the program from such a recording medium, and transfers the program, onto one of an internal recording device and an external recording device for storage. The management program may be recorded on a recording device (recording medium) such as a magnetic disk, an optical disk, or a magneto-optical disk, and then the management program may be supplied to the information processing device from the recording device via a communication line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing device for executing first and second programs, comprising:
   a main memory;
   a management memory for storing first page information including first virtual addresses used by the first program, second page information including second virtual addresses used by the second program and management information indicative of association between first and second virtual addresses and physical addresses of the main memory; and
   a processor for executing the first program, the second program, and a management program by loading the first page information, the second page information and the management information respectively, the process executed by the management program including:
   receiving a request to assign a shared area of the main memory to be shared by the first and second programs from the second program;
   determining a physical address of the shared area corresponding to one of the first virtual addresses used by the first program and one of the second virtual addresses used by the second program and storing information of association between the physical address of the shared area and the ones of the first and second virtual addresses as a part of the management information in the management memory;
   transmitting a notification of data writing into the shared area by the first program from the first program to the second program;
   locking the shared area so as to prevent the shared area from being overwritten after the notification by adding lock information into the management memory; and
   unlocking the shared area after the second program has read data from the shared area so as to allow either of the first and the second programs to write data into the shared memory by resetting the lock information in the management memory.

2. The information processing device according to claim 1, wherein the process includes: storing information of association between the physical address of the shared area and the ones of the first and second virtual addresses in the management memory.

3. The information processing device according to claim 1, wherein the process includes:
   receiving an access restriction request with respect to the shared area issued by the second program, and
   judging whether the access restriction request is legal or not on the basis of the owner of the shared area of the main memory.

4. The information processing device according to claim 1, wherein
   the locking of the process locks the shared area so as to prevent the second program from reading out data from the shared area after the notification.

5. The information processing device according to claim 1, wherein the process includes: re-writing the physical address of the page information so as to be different from the physical address of the shared area.

6. A method for controlling an information processing device for executing first and second programs including a main memory, a management memory, and a processor, the method comprising:
   executing, by the processor, the first program, the second program, and a management program by loading first page information, second page information and management information respectively, the first page information including first virtual addresses used by the first program stored in the management memory, the second page information including second virtual addresses used by the second program stored in the management memory, and the management information indicative of association between first and second virtual addresses and physical addresses of the main memory stored in the management memory;
   receiving a request to assign a shared area of the main memory to be shared by the first and second programs from the second program;
   determining a physical address of the shared area corresponding to one of the first virtual addresses used by the first program and one of the second virtual addresses used by the second program and storing information of association between the physical address of the shared area and the ones of the first and second virtual addresses as a part of the management information in the management memory;
   transmitting a notification of data writing into the shared area by the first program from the first program to the second program;
   locking the shared area so as to prevent the shared area from being overwritten after the notification by adding lock information into the management memory; and
   unlocking the shared area after the second program has read data from the shared area so as to allow either of the first and the second programs to write data into the shared memory by resetting the lock information in the management memory.

7. The method according to claim 6, further comprising: receiving an access restriction request with respect to the shared area issued by the second program, and judging whether the access restriction request is legal or not on the basis of the owner of the shared area of the main memory.

8. The method according to claim 6, wherein the locking of the process locks the shared area so as to prevent the second program from reading out data from the shared area after the notification.

9. The method according to claim 6, further comprising: re-writing the physical address of the page information so as to be different from the physical address of the shared area.

10. A non-transitory computer readable medium storing a management program for controlling an information processing device for executing first and second programs, the device including a main memory, a management memory, and a processor, the process executed by the management program comprising:
   executing the first program, the second program, and the management program by loading first page information, second page information and management information respectively, the first page information including first virtual addresses used by the first program stored in the management memory, the second page information including second virtual addresses used by the second program stored in the management memory, and the management information indicative of association between first and second virtual addresses and physical addresses of the main memory stored in the management memory;
   receiving a request to assign a shared area of the main memory to be shared by the first and second programs from the second program;

determining a physical address of the shared area corresponding to one of the first virtual addresses used by the first program and one of the second virtual addresses used by the second program and storing information of association between the physical address of the shared area and the ones of the first and second virtual addresses as a part of the management information in the management memory;

transmitting a notification of data writing into the shared area by the first program from the first program to the second program;

locking the shared area so as to prevent the shared area from being overwritten after the notification by adding lock information into the management memory; and unlocking the shared area after the second program has read data from the shared area so as to allow either of the first and the second programs to write data into the shared memory by resetting the lock information in the management memory.

11. The non-transitory computer readable medium according to claim 10, further comprising, storing information of association between the physical address of the shared area and the ones of the first and second virtual addresses in the management memory.

12. The non-transitory computer readable medium according to claim 10, further comprising: receiving an access restriction request with respect to the shared area issued by the second program, and judging whether the access restriction request is legal or not on the basis of the owner of the shared area of the main memory.

13. The non-transitory computer readable medium according to claim 10, wherein the locking of the process locks the shared area so as to prevent the second program from reading out data from the shared area after the notification.

14. The non-transitory computer readable medium according to claim 10, further comprising: re-writing the physical address of the page information so as to be different from the physical address of the shared area.

* * * * *